Dec. 17, 1940.  R. C. TARTAR  2,225,528
DOORSTOP
Filed July 25, 1939  2 Sheets-Sheet 1

Inventor
R. C. Tartar
By Clarence A. O'Brien
and Hyman Berman
Attorneys

Dec. 17, 1940.  R. C. TARTAR  2,225,528
DOORSTOP
Filed July 25, 1939  2 Sheets-Sheet 2

Inventor
R. C. Tartar
By Clarence A. O'Brien
and Hyman Berman
Attorneys

Patented Dec. 17, 1940

2,225,528

UNITED STATES PATENT OFFICE 2,225,528

DOORSTOP

Roscoe C. Tartar, Liberty, Ky.

Application July 25, 1939, Serial No. 286,483

1 Claim. (Cl. 292—75)

This invention relates to a doorstop, the general object of the invention being to provide a rotary wheel formed of resilient material with spring means for attaching the wheel to a door in such a manner that the wheel is passed against the floor so as to yieldingly hold the door in the position to which it has been adjusted.

Another object of the invention is to provide the wheel with recesses which are so formed and arranged that when a recessed portion comes adjacent the floor said portion of the wheel will collapse to provide a flat portion for engaging the floor which firmly holds the door in adjusted position.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which.

Figure 1:
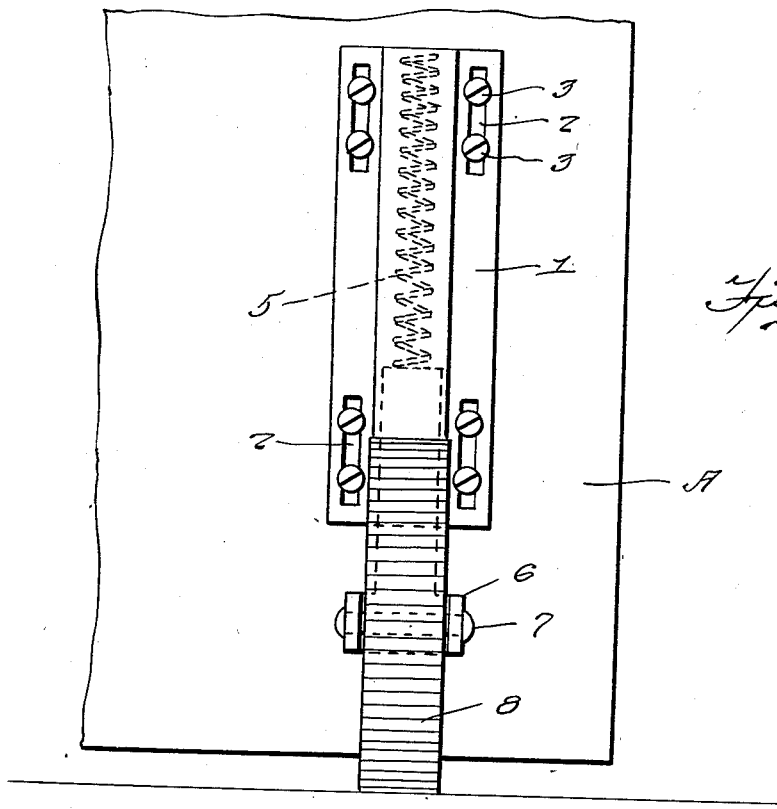
Figure 1 is a fragmentary view of the rear portion of a door showing the invention applied thereto.
Figure 4:
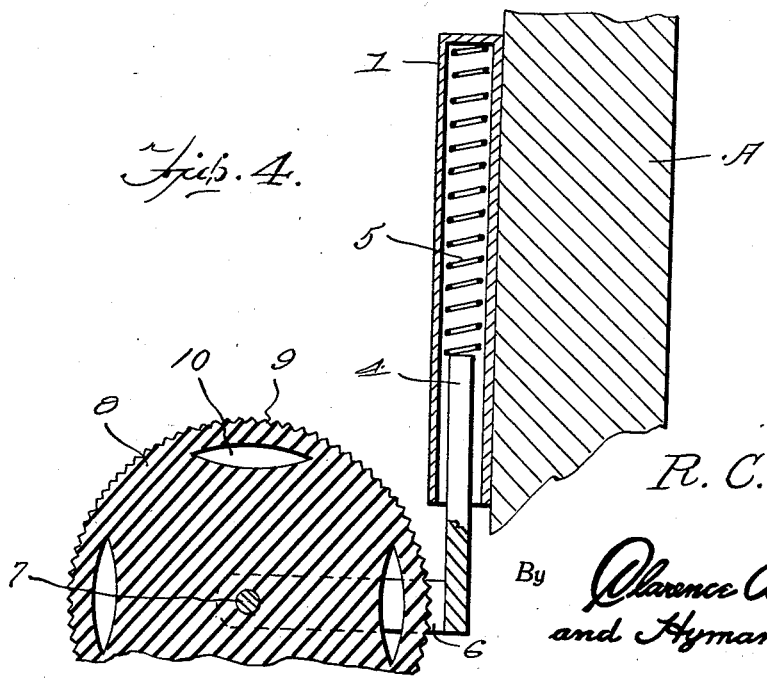
Figure 4 is a longitudinal sectional view through the device and a portion of the door.
Figure 2:
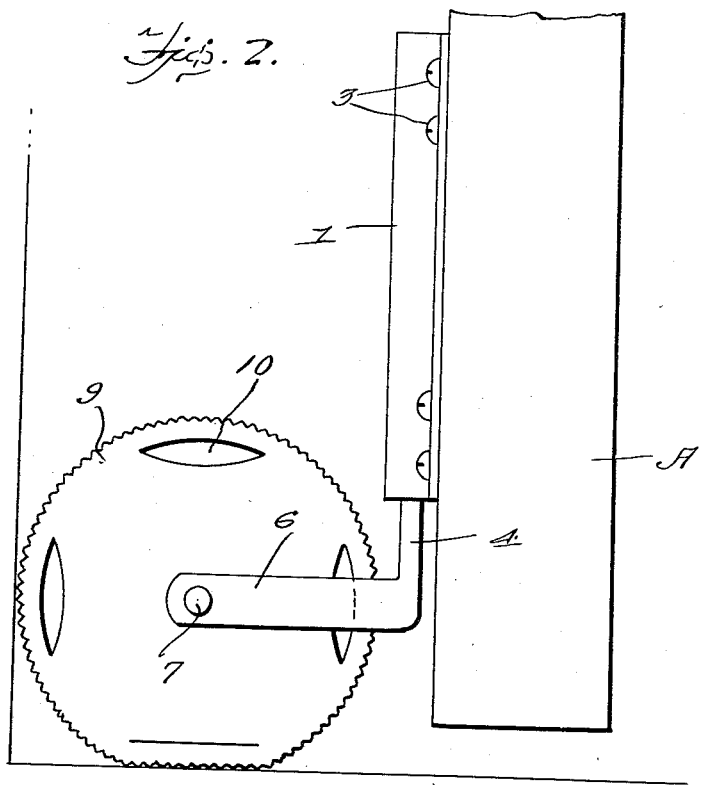
Figure 2 is an edge view of the door being held in a position substantially parallel to a wall by the invention.
Figure 3:
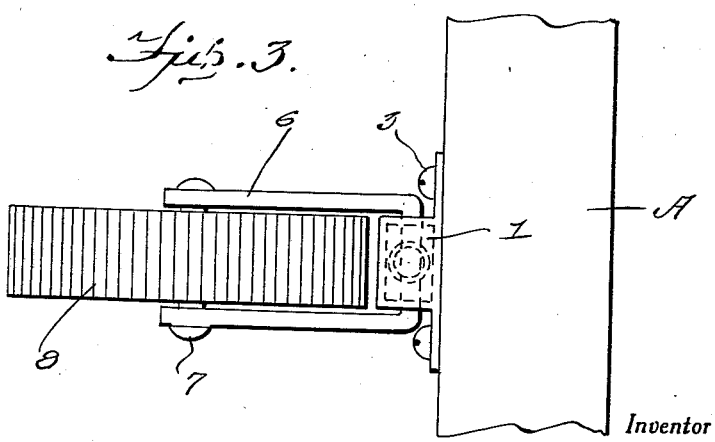
Figure 3 is a top plan view of the device attached to a door.

In these views the numeral 1 indicates a channel-shaped bracket provided with flanges which are provided with elongated slots 2 for receiving the screws 3 so that the bracket can be adjustably connected to a door A. A shank 4 of flat form extends into the lower part of the bracket and a coiled spring 5 in the channel part of the bracket tends to force the shank downwardly. The shank is provided with a forked lower end 6 which extends at right angles and supports a spindle or axle 7 for a wheel 8. Said wheel is formed of rubber or the like and has a corrugated periphery 9 and it is also provided with a plurality of recesses 10, each recess being of substantially oval shape and extending from one side of the wheel through the other side and these recesses are located adjacent the periphery of the wheel so as to make that part of the wheel between a recess and the periphery flexible. Thus when a recess comes opposite the floor the pressure of the spring 5 on the parts will cause this portion of the wheel to collapse, as shown in Figure 2, thus providing a flat portion at the periphery of the wheel for engaging the floor so that the door is firmly held in the position to which it has been adjusted by hand. Of course, pressure on the door will cause the wheel to rotate and thus the door can be moved by hand to the desired position.

Figure 2 shows the device not only acting as a check or stop for the door but also as a bumper as the device will strike the vertical wall and thus limits movement of the door toward the wall and thus prevent the door from striking the wall.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a combined doorstop and bumper of the class described including means for supporting the device at the base of the door in proximate relation to the floor comprising a movable member and means to normally urge said member toward the floor, a floor and wall engaging roller comprising a substantially circular resilient body member, peripheral corrugations on said body for frictional engagement with the floor, said body also having a plurality of openings adjacent its periphery which openings permit the periphery of the body to yield and flatten under pressure increasing the contact area thereof, said openings being so arranged that when the door is held fully open with a flattened portion engaging the floor, another of said portions may be in a position to provide a yielding contact with the wall.

ROSCOE C. TARTAR.